(12) United States Patent
Sylvain (10) Patent No.: US 7,447,150 B1
(45) Date of Patent: Nov. 4, 2008

(54) AUTOMATED PATH RESTORATION FOR PACKET TELEPHONY

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 1046 days.

(21) Appl. No.: 10/439,592

(22) Filed: May 16, 2003

(51) Int. Cl.
*H04J 1/16* (2006.01)
*H04L 12/28* (2006.01)

(52) U.S. Cl. .................... 370/218; 370/352; 370/392

(58) Field of Classification Search .............. 370/216
See application file for complete search history.

(56) References Cited

U.S. PATENT DOCUMENTS

| | | | | |
|---|---|---|---|---|
| 6,530,032 | B1 * | 3/2003 | Shew et al. .................... 714/4 |
| 6,721,565 | B1 * | 4/2004 | Ejzak et al. .................. 455/436 |
| 6,901,048 | B1 * | 5/2005 | Wang et al. .................. 370/228 |
| 6,965,775 | B2 * | 11/2005 | Antoniou et al. ............ 455/450 |
| 6,982,951 | B2 * | 1/2006 | Doverspike et al. ......... 370/217 |
| 2001/0024438 | A1 * | 9/2001 | Sugiyama et al. ........... 370/352 |
| 2002/0009079 | A1 * | 1/2002 | Jungck et al. ................ 370/389 |
| 2002/0105910 | A1 * | 8/2002 | Maher et al. ................. 370/235 |
| 2002/0176355 | A1 * | 11/2002 | Mimms et al. ............... 370/216 |
| 2003/0161304 | A1 * | 8/2003 | deBoer et al. ................ 370/386 |
| 2003/0179707 | A1 * | 9/2003 | Bare .......................... 370/235 |
| 2004/0156316 | A1 * | 8/2004 | Mukherjee et al. ........... 370/235 |
| 2005/0101245 | A1 * | 5/2005 | Ahmavaara ..................... 455/1 |

* cited by examiner

*Primary Examiner*—Andrew Lee
(74) *Attorney, Agent, or Firm*—Withrow & Terranova, PLLC (57) ABSTRACT

The present invention provides an automatic restoration architecture for packet telephony applications. Each communication endpoint has access to a pair of edge routers, which interface with a core network through which communication paths are established. The communication paths effectively provide for the delivery of packets between a first edge router for a first endpoint and a first edge router for a second endpoint. When a communication session is established, a communication path is set up between the first edge router for the first endpoint and the first edge router for the second endpoint. Upon detecting a failure along the communication path, an attempt to restore the communication path between the first edge routers may be provided. If such restoration is not effective, an alternate communication path may be established with a second edge router for either of the first or second endpoints.

30 Claims, 9 Drawing Sheets

AUTOMATED PATH RESTORATION FOR PACKET TELEPHONY

FIELD OF THE INVENTION

The present invention relates to telecommunications, and in particular to ensuring fast recovery following failures in packet telephony networks.

BACKGROUND OF THE INVENTION

There is a growing interest in the convergence of the public switched telephone network (PSTN), the Internet and other internets and intranets. The convergence of these networks requires technology that facilitates interworking in a uniform and effective manner. The next generation of unified networks will provide an open and scalable architecture to accommodate multiple vendors and protocols under a common packet network. At the moment, there are several obstacles to providing telephony services on a packet network with the same level of performance and availability as is offered by the PSTN today.

The traditional PSTN provides constant bandwidth streams of information between users. These media streams travel over dedicated circuits, which have proven to be very reliable and capable of recovering from various failures in a fast and uninterrupting manner. On the other hand, packet networks have been prone to packet loss and delays, which affect the quality of streaming media required to carry voice communications. Given the high quality levels associated with the PSTN, subscribers expect and demand traditional quality regardless of the transmission medium. Further, packet telephony applications are prone to excessive delays when recovering from communication or network failures.

Given the desire to use packet networks as the centerpiece for telephony communications, there is a need for a way to ensure quality of service levels for telephony communication carried at least in part over packet networks and provide fast and effective recovery in response to network failures.

SUMMARY OF THE INVENTION

The present invention provides an automatic restoration architecture for packet telephony applications. Each communication endpoint has access to a pair of edge routers, which interface with a core network through which communication paths are established. The communication paths effectively provide for the delivery of packets between a first edge router for a first endpoint and a first edge router for a second endpoint. When a communication session is established, a communication path is set up between the first edge router for the first endpoint and the first edge router for the second endpoint. Upon detecting a failure along the communication path, an attempt to restore the communication path between the first edge routers may be provided. If such restoration is not effective, an alternate communication path may be established with a second edge router for either of the first or second endpoints. In general, the acting edge router can establish communication paths through either of the edge routers associated with an endpoint at the other end of the core network. The communication paths are preferably connection oriented, such as those provided by label switched paths in an MPLS network or an ATM permanent virtual circuit in an ATM network.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
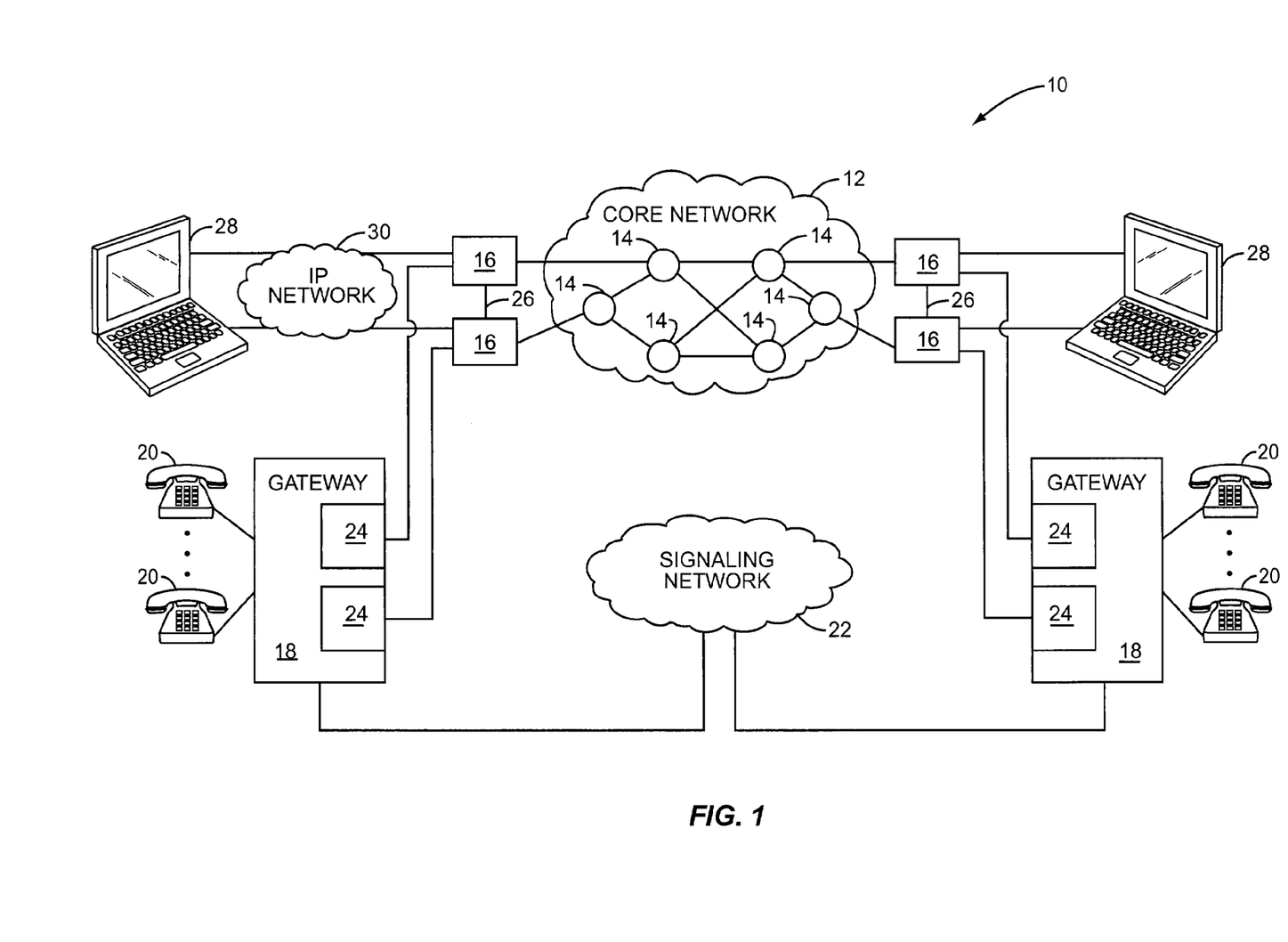
FIG. 1 is a block representation of a communication network infrastructure according to one embodiment of the present invention.

With reference to FIG. 1, a communication environment 10 is centered about a core packet network 12 having numerous routers 14 interconnected to facilitate the routing of packets between edge routers 16. The edge routers 16 act as the ingress and egress points to the core network 12 for any number of associated devices, such as media gateways 18. The media gateways 18 provide a packet interface for circuit-switched telephony devices, such as telephones 20. Media gateway controllers (not shown) are provided in a signaling network 22 and effectively control groups of media gateways 18. The media gateways 18 may have multiple communication interfaces 24 supporting communications over redundant paths. The media gateway controllers may communicate with each other to facilitate call control between media gateways 18, or may cooperate with the call control entities of an intelligent network (IN) of the public switched telephone network (PSTN). Further, cross links 26 may be provided to facilitate temporary redirection of traffic between associated routers 16 in case there is a failure on one of the redundant paths connecting one router 16 and an interface 24 of the media gateway 18. Preferably, a pair of edge routers 16 is used to support a cluster of gateways 18 wherein each interface 24 is associated one of the pair of edge routers 16. Alternatively, one edge router 16 may be configured with redundant, carrier grade interfaces capable of providing the fail-over protection described in further detail below.

To facilitate interworking of circuit-switched and packet communications, there are two primary elements: a media gateway 18 and a media gateway controller. The media gateway 18 provides the actual interface between the packet network associated with an edge router 16 and the telephony devices, such as telephones 20, or circuit-switched telephony interfaces such as TDM trunks (not shown). The media gateway controller provides decision-making and coordination between media gateways 18 to facilitate interworking, alone or in association with other media gateway controllers in the signaling network 22 or the call control services of the PSTN.

The primary responsibility of a media gateway 18 is to allow traditional telephony media, such as voice, to be transported in a packet network using an Internet Protocol (IP) format, asynchronous transfer mode (ATM) format, or the like. The media gateways 18 allow media to move without loss of integrity or quality between networks and network technologies. In essence, the media gateways 18 provide bi-directional interfaces between disparate networks, and typically, between a traditional circuit-switched telephony network and a packet network.

The media gateways 18 provide bi-directional interfaces between circuit-switched networks, such as the TDM-based PSTN devices or networks, and the core network 12 via the edge routers 16. For example, a media gateway 18 may implement high-speed TDM trunk interfaces or line interfaces, which are commonly used interfaces between switching elements in a circuit-switched network.

The primary responsibilities of the media gateway controllers are to make decisions based on flow-related information and to provide instructions on interconnecting elements or endpoints within and throughout the networks. Media gateway controllers store status information on media flows and may be used to generate administrative records for a variety of media-related activities, such as billing. Most prominently, media gateway controllers provide coordination of media gateways 18. Typically, media gateway controllers direct media gateways 18 to set up, handle, and end individual media flows, which will take place between the respective media gateways 18.

In addition to supporting circuit-switched communications via the media gateways 18, the edge routers 16 may also support further packet communications with packet-based endpoints 28, such as personal computers and packet telephones, directly or indirectly via Internet Protocol (IP) networks 30. As with interfacing with the media gateways 18, each endpoint 28 may interface with either of the redundant edge routers 16. Accordingly, each associated pair of edge routers 16 will provide two different interfaces for circuit- or packet-switched communications, as the case may be.

Figure 2:
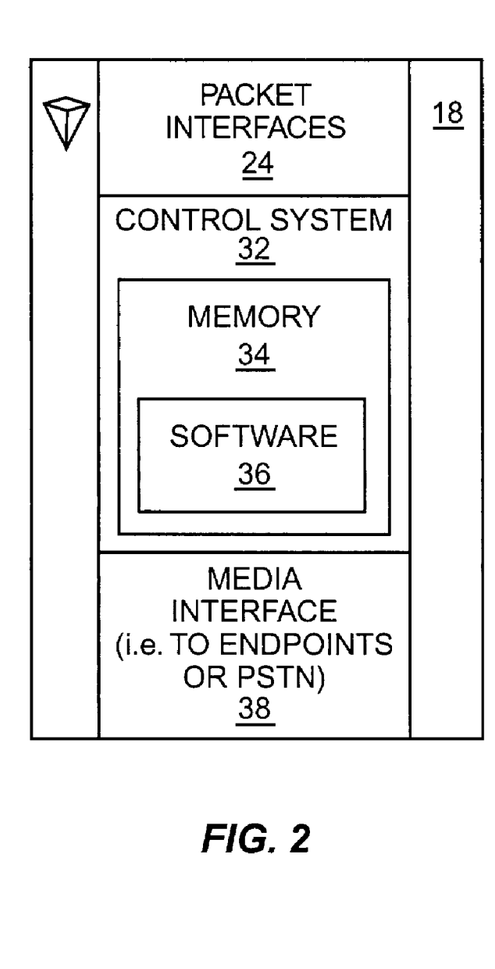
FIG. 2 is a block representation of a gateway according to one embodiment of the present invention.

Turning now to FIG. 2, a block schematic of a media gateway 18 is shown having a control system 32 containing memory 34 and the requisite software 36 for operation. The control system 32 operates to provide a bi-directional interface between one or more packet interfaces 24 and a media interface 38. The media interface 38 is the interface opposite the packet network, and is preferably a circuit-switched interface supporting traditional trunks and lines of a traditional, circuit-switched telephone network. When interfacing with traditional telephony equipment, the media interface 34 is typically configured to handle TDM communications or any other analog or digital data streams required to facilitate such communications. As illustrated in FIG. 1, the media interface 34 may be a line interface supporting a telephone 20.

Figure 3:
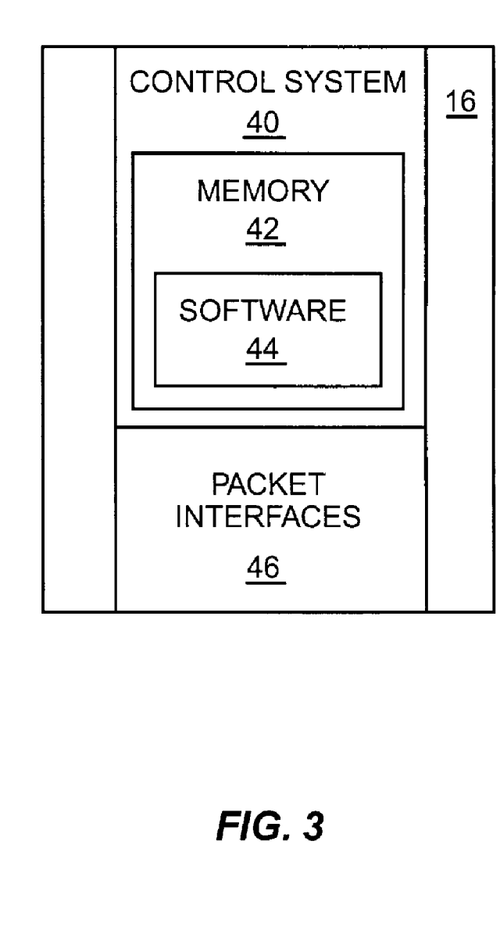
FIG. 3 is a block representation of an edge router according to one embodiment of the present invention.

FIG. 3 is a block schematic of an edge router 16 having a control system 40 with associated memory 42 and the requisite software 44 for operation. The edge router 16 will have packet interfaces 46 capable of communicating with the associated media gateways 18 or directly or indirectly with endpoints 28, as well as with the routers 14 in the core network 12 as will be described below in greater detail.

Figure 4:
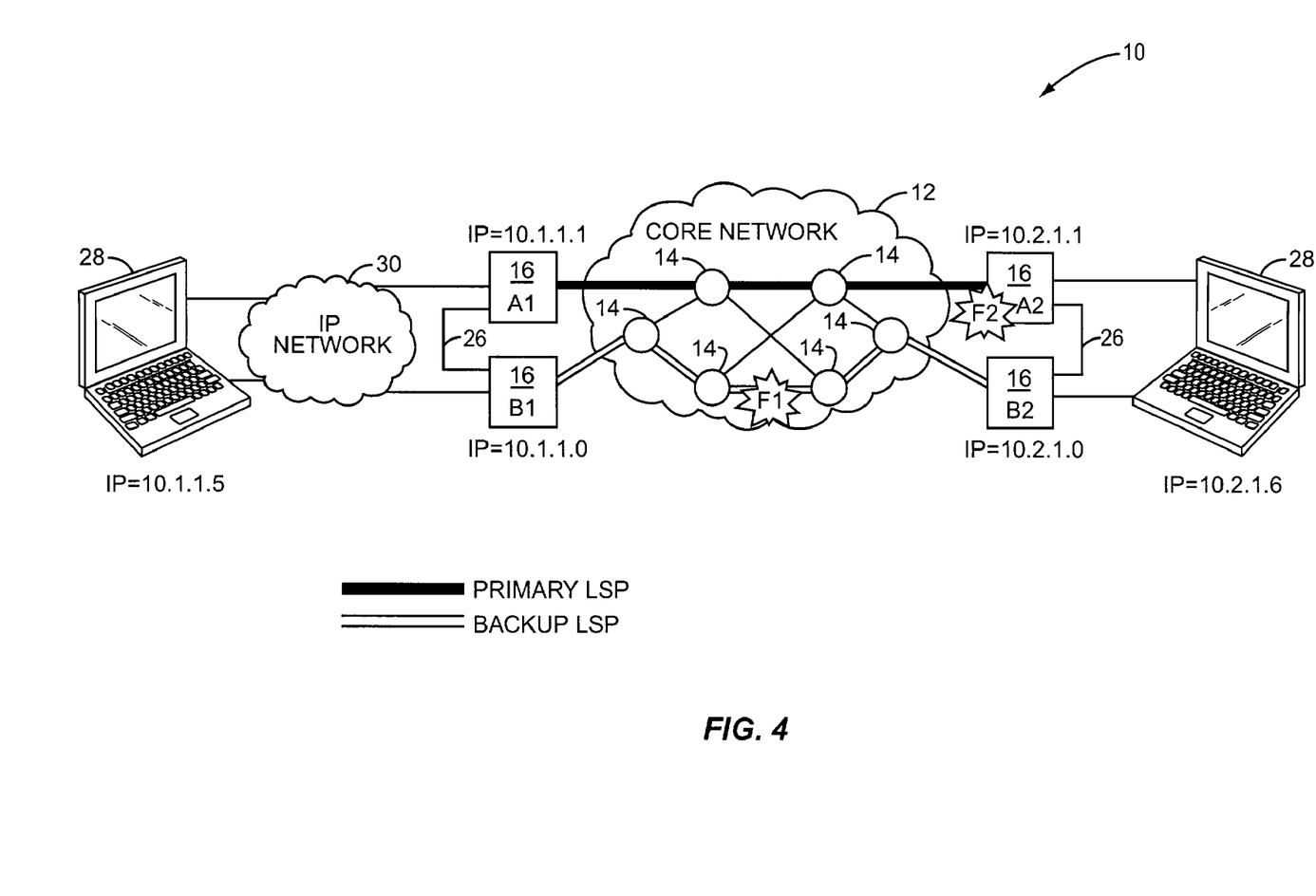
FIG. 4 is a block representation of the communication network infrastructure depicting a first dual fault scenario.

With reference to FIG. 4, assume the routers 14 in the core network 12 and the edge routers 16 cooperate to provide a multi-protocol label switching (MPLS) architecture. In an MPLS architecture, labels are appended to data packets being transferred from one edge router 16 to another via routers 14 in the core network 12. The labels define a particular label-switched path (LSP) over which the data packet should travel from one edge router 16 to another. Notably, the LSP is connection oriented and can carry data for numerous endpoints 28 (or media gateways 18 as illustrated in FIG. 1) at any given time. In this embodiment, assume the edge routers 16 are label edge routers (LERs), and that the routers 14 in the core network 12 are label switch routers (LSRs). When packets enter an MPLS architecture, the LERs look at the destination for the packet and any other packet attributes and assign the packet a label. The LERs then assign the data packet to a corresponding LSP, and it is sent to a first LSR in the assigned LSP. Each LSR along the LSP will forward the data packet along the LSP based on the label, until the packet reaches a destination LER, which will remove the label and route the packet to the appropriate endpoint 28 (or media gateway 18). For the purposes of conciseness and readability, the term endpoint, even when referenced with the numeral 28 will include the gateways 18, because the functionality of the LERs is independent of the type of endpoint or whether the endpoint acts to continue or extend a communication session.

As the packets travel along the LSP, the LSRs may simply monitor the label and forward the packet and label untouched, or may replace the label with a new label to facilitate routing or switching along the LSP. Each LSR will include routing tables based on the labels. Thus, LSPs extend between LERs, which are identified by labels. The LERs assign, add, and remove labels as traffic enters or exits the MPLS architecture. The MPLS architecture allows the establishment of LSPs having a defined bandwidth reserved for the specified traffic source. Those skilled in the art will be familiar with the concepts of establishing LSPs in an MPLS architecture. In the preferred embodiment, the LSPs are provisioned by an operation system or network provisioning tool based on constraints provided by the network operator. In practice, a bi-directional packet flow between LERs requires two uni-directional LSPs—one LSP for each direction. Both LSPs forming part of a single communication path preferably share common routing throughout the core network 12. For the purposes of clarity, it is assumed that each bi-directional LSP includes two uni-directional LSPs to facilitate bi-directional communications.

Assume that a primary LSP is established between a first LER A1 (edge router 16) and a second LER A2 (edge router 16), as illustrated in FIG. 4. Each LSP preferably has a defined bandwidth and provides controlled access. One method to control access and not exceed the capacity of the LSP is to use a virtual, packet-based trunk group mapped to correspond to the LSP. As such, the LSP is engineered and provisioned with a guaranteed bandwidth matching the virtual trunk group size. For further information related to controlled access and virtual trunk groups, U.S. patent application No. 60/367,676 filed Mar. 26, 2002; U.S. patent application Ser. No. 10/175, 122 filed Jun. 19, 2002; and U.S. patent application Ser. No. 10/194,114 filed Jul. 12, 2002 are incorporated herein by reference in their entireties. Individual media flows are set up between endpoints 28 and the LERs provided by the edge routers 16. Again, the individual media flows represent a bi-directional communication.

The packets associated with individual media flows are sent back and forth between the endpoints 28 and one of the LERs provided by the edge routers 16. Accordingly, the individual media flows feed into a virtual trunk group supported by a pair of LSPs at the LERs provided by the edge routers 16. For example, individual real-time protocol (RTP) voice over IP streams generated at the endpoints 28 are sent to the LER and form a media flow. The LER will assign a label to the packets forming the media flow, and based on the label, route the packet to an LSR provided by a router 14 associated with the LSP. In converse, packets coming in over a virtual trunk group from an LSP into the LER will have their labels removed, and will be routed over an individual media flow to the appropriate endpoint 28 to facilitate communications.

The primary reason for providing each endpoint 28 with access to two LERs is to enable redundancy between pairs of LERs at each end of the MPLS network (core network 12). Accordingly, efforts to provide redundancy in such an infrastructure provide for a redundant LSP to be provisioned between the unused LERs of the LER pairs associated with the primary LSP, as illustrated in FIG. 4. With this infrastructure, no single fault will prevent the endpoints 28 from communicating with each other, because an alternate path always exists. However, there are dual-fault scenarios wherein one fault occurs for each path to cause an overall failure in communications between the endpoints 28. For example, a link may fail (fault F1) on the backup LSP when one of the LERs associated with the primary LSP is taken out of service (fault F2) for a software upgrade. Accordingly, dual-fault scenarios exist, which will prevent endpoints 28 from communicating with each other.

Figure 5:
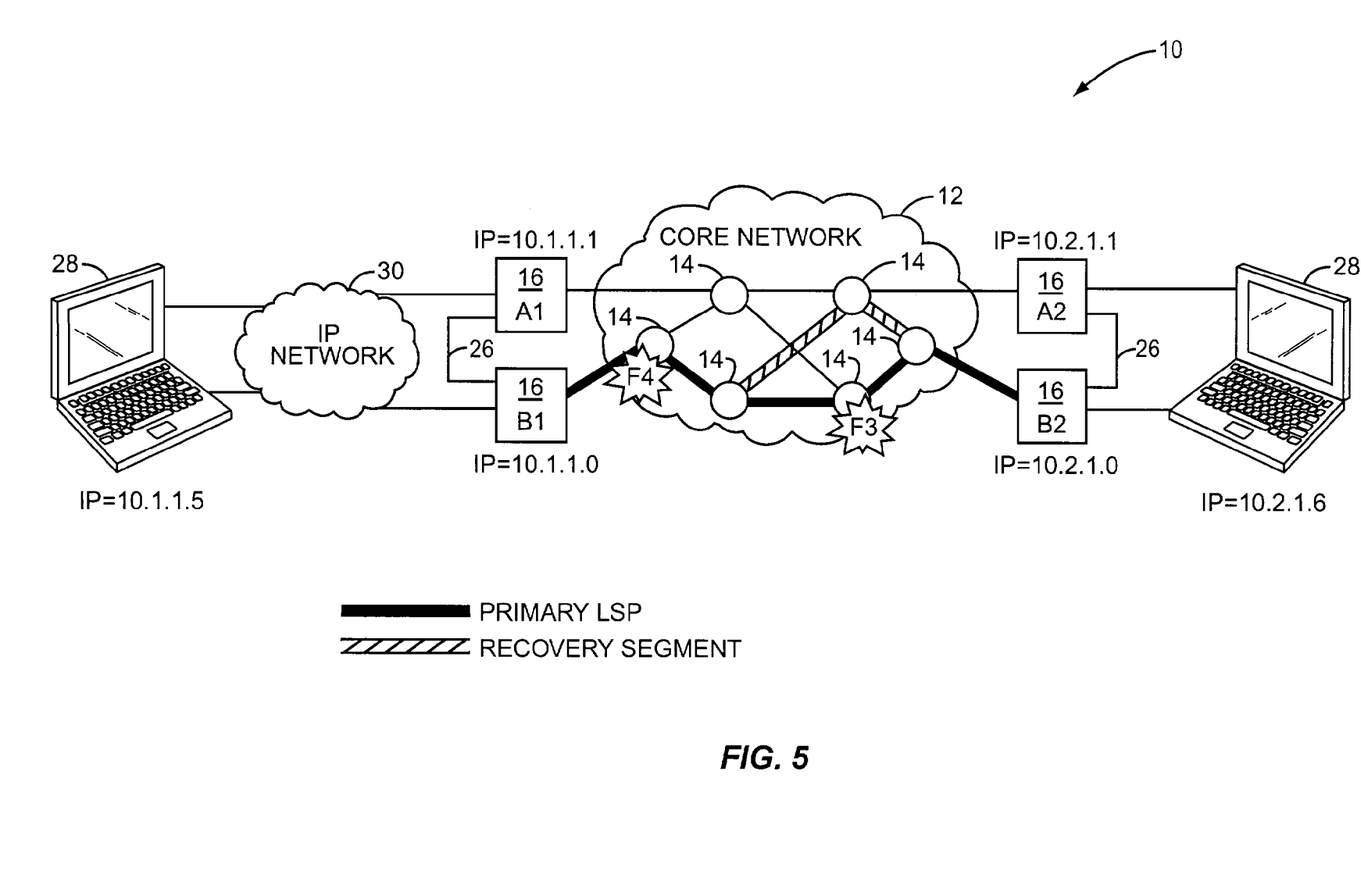
FIG. 5 is a block representation of the communication network infrastructure depicting a second dual fault scenario.

FIG. 5 illustrates a technique for repairing a failed LSP by providing a recovery path around the faulty device or link. Assume that the primary LSP is established between LER B1 and LER B2, and that one of the LSRs supporting the primary LSP fails (fault F3). In this scenario, a recovery segment is established to restore the LSP between LERs B1 and B2, wherein the recovery segment essentially bypasses the failed LSR. However, if a failure occurs at an LSR directly coupled to LER B1 (fault F4), additional links may not be provided between LER B1 and the newly failed LSR. As such, communications between the endpoints 28 will fail. Although numerous restoration routes may be pre-established for various types of LSR failures, such routing is very complex, wastes network resources, and increases the risk of congestion when traffic is diverted to the recovery segments, which may already be in use as an LSP for another session.

Figure 6:
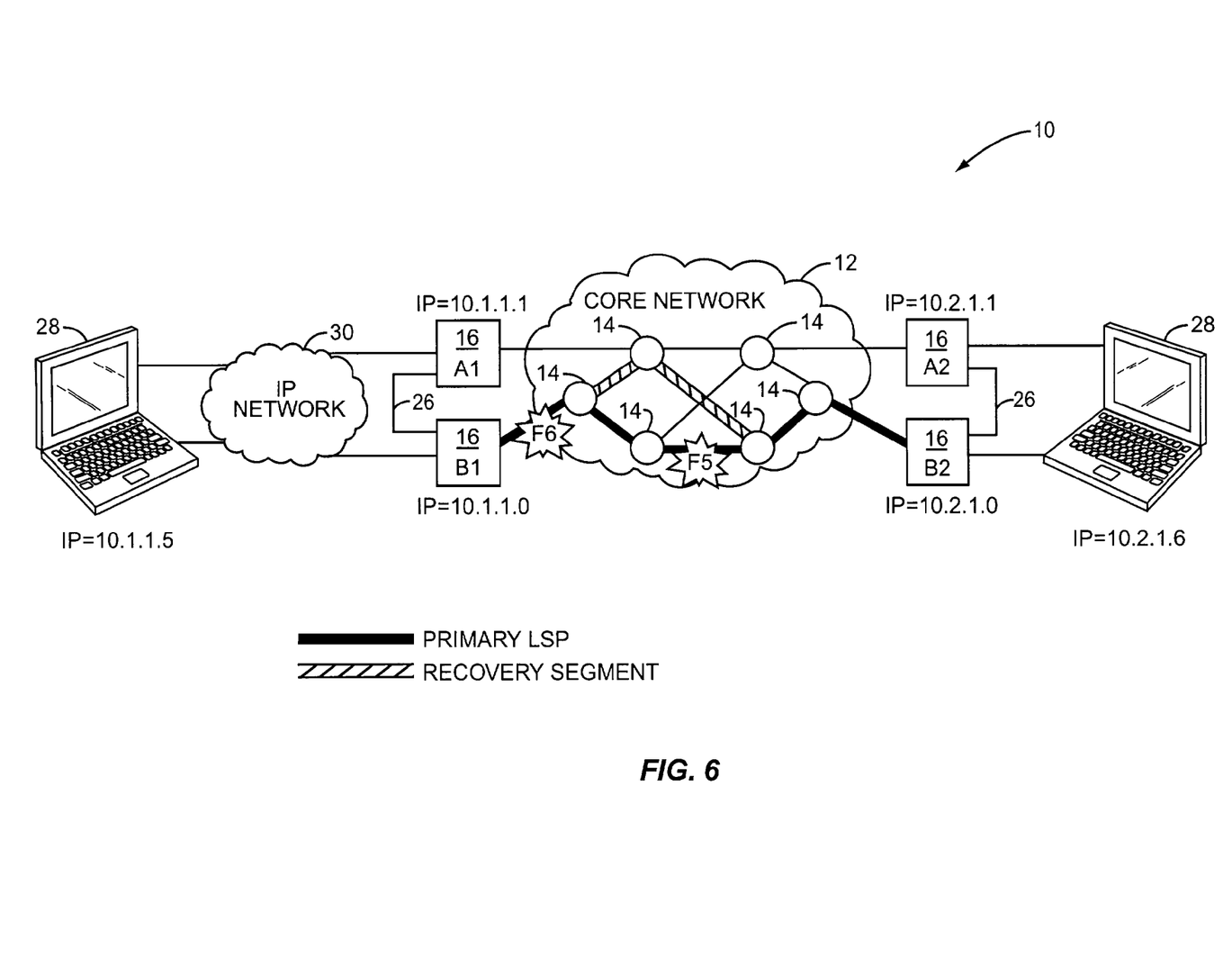
FIG. 6 is a block representation of the communication network infrastructure depicting a third dual fault scenario.

Turning now to FIG. 6, recovery segments can be provided for link failures between LSRs. For example, if a link fails between two LSRs (fault F5), a recovery segment may be used to effectively route around the failed segment. Unfortunately, if another failure occurs in the LSP, such as between LER B1 and the servicing LSR (fault F6), the communication session would fail unless extra links were provided between LER B1 and the servicing LSR. Again, attempting to address these multi-fault scenarios through a number of pre-provisioned restoration segments would unnecessarily increase complexity, waste network resources, and increase the risk of congestion on shared recovery segments. As such, it is difficult to pre-provision backup LSPs or recovery segments for an LSP to anticipate dual-fault scenarios in an effective and efficient manner.

Figure 7:
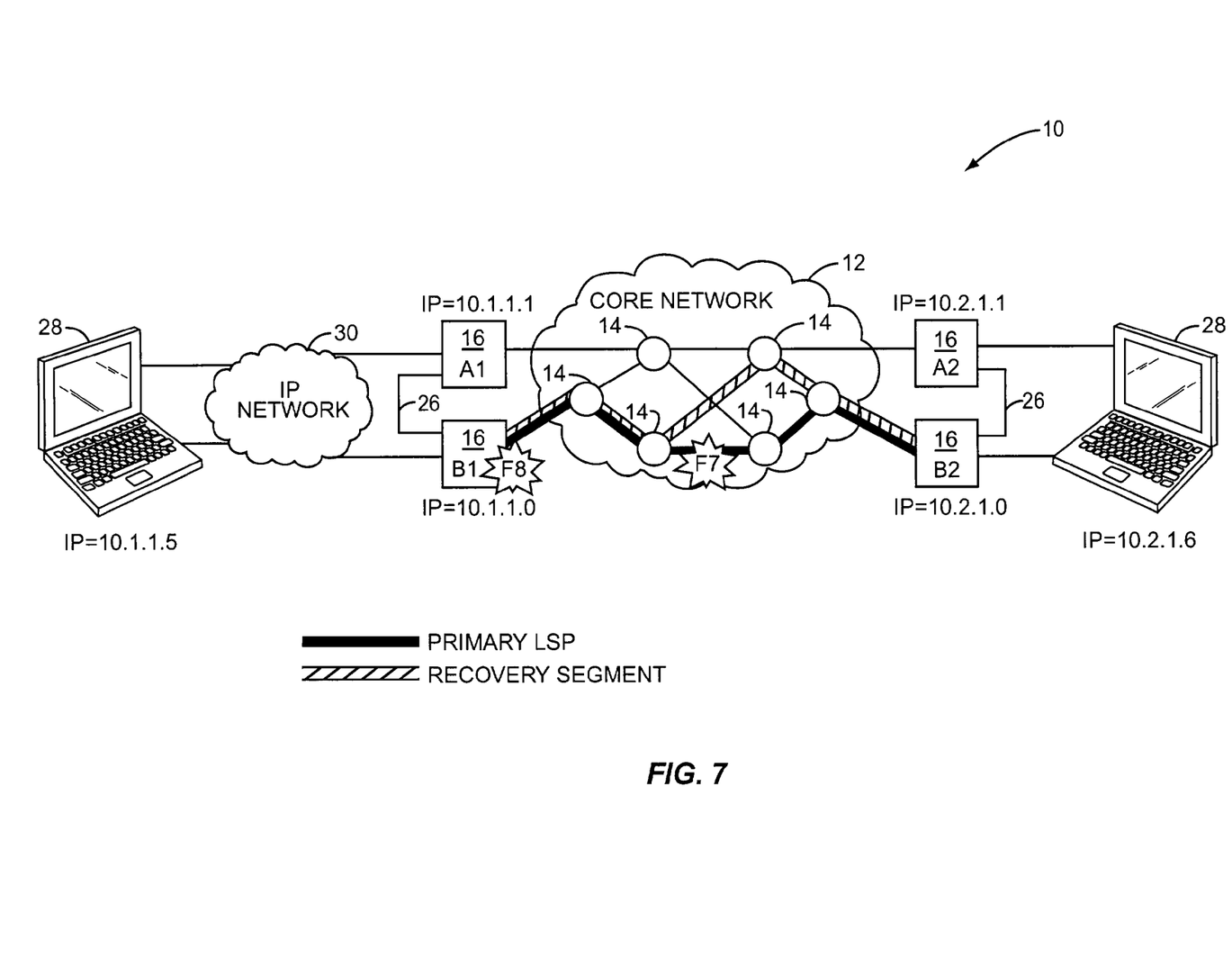
FIG. 7 is a block representation of the communication network infrastructure depicting a fourth dual fault scenario.

With reference to FIG. 7, LERs B1 and B2 supporting a primary LSP may be configured to dynamically address faults and attempt to establish new LSPs through the MPLS network (core network 12) when a fault is detected instead of relying on pre-provisioned restoration segments. For example, once a primary LSP is established between LERs B1 and B2, a link fault (fault F7) between two LSRs will trigger LERs B1 and B2 to establish a recovery LSP between LERs B1 and B2 in hopes that an alternate path can be established to effectively bypass the failed link. Although this technique is effective for handling single faults within the MPLS network, faults occurring at the LER (fault F8) or in links connecting the LER to the MPLS network still result in a complete failure of communications between the endpoints 28 served by LERs B1 and B2. Thus, even though there are techniques for addressing faults within an MPLS network, there is a need for a more effective technique to address faults occurring in LERs, as well as multi-fault scenarios affecting LSPs. Further, there is a need to provide such capability without wasting network resources or making implementation too complex.

Figure 8:
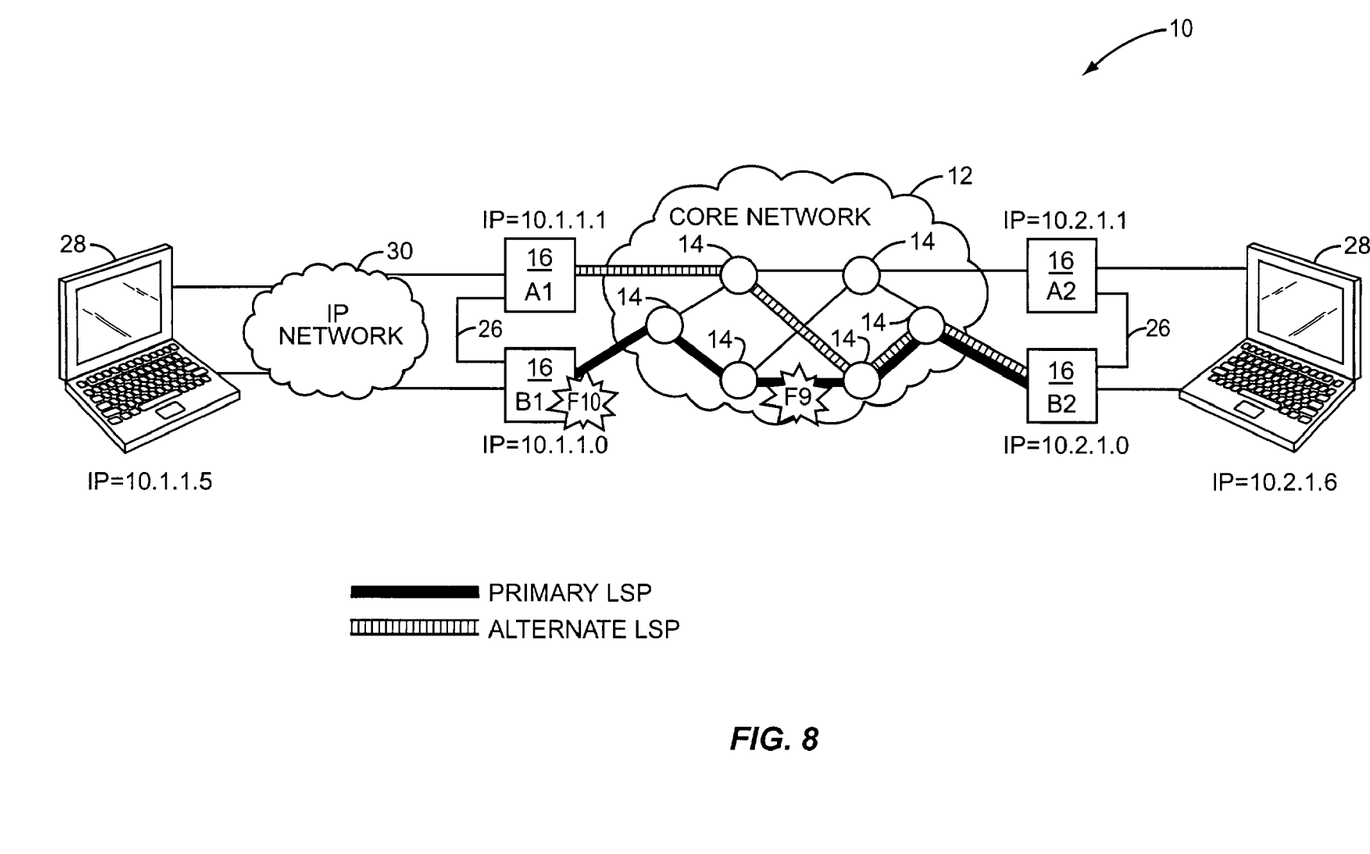
FIG. 8 is a block representation of the communication network infrastructure depicting a path restoration technique according to one embodiment of the present invention.

The present invention fulfills these needs by configuring an LER with the ability to restore an LSP to an alternate LER, which serves a common endpoint 28. In short, an LER supporting a first endpoint 28 has the ability to establish LSPs with either of the redundant LERs servicing a second endpoint 28. As illustrated in FIG. 8, LER B2 may be provisioned or dynamically instructed to set up an LSP to a specific LER, B1, which is identified by a destination LER IP address, 10.1.1.0. LER B2 is also provided with an alternate LER, A1, which is identified by IP address 10.1.1.1. When the primary LSP fails (fault F9), LER B2 will initially try to reconfigure the primary LSP to the original LER B1 in an attempt to restore the primary LSP. If the attempt at restoration fails, LER B2 will set up an alternate LSP to LER A1 using address 10.1.1.1. Notably, the communication session between endpoints 28 associated with addresses 10.1.1.5 and 10.2.1.6 may be supported over either the primary LSP or the alternate LSP if the primary LSP fails. Again, each endpoint 28 can communicate with two LERs, A1 and B1 or A2 and B2. Further, any of the LERs A1, A2, B1, B2 are configured to operate as described and establish an alternate LSP if the primary LSP fails and cannot be restored. For example, LER B1 may be provisioned to establish the primary LSP with LER B2 as illustrated, as well as be provisioned to establish an alternate LSP (not shown) to LER A2, which is identified by address 10.2.1.1. The attempt to restore the primary LSP prior to setting up the alternate LSP is optional, but preferable given the restoration capabilities built into MPLS architectures. These restoration attempts generally try alternate routes through the MPLS network, and will generally find an alternate path around a failed link or LSR. The present invention is particularly beneficial when failures occur at the LER (fault F10) or in links between the LERs and the core network 12.

Figure 9:
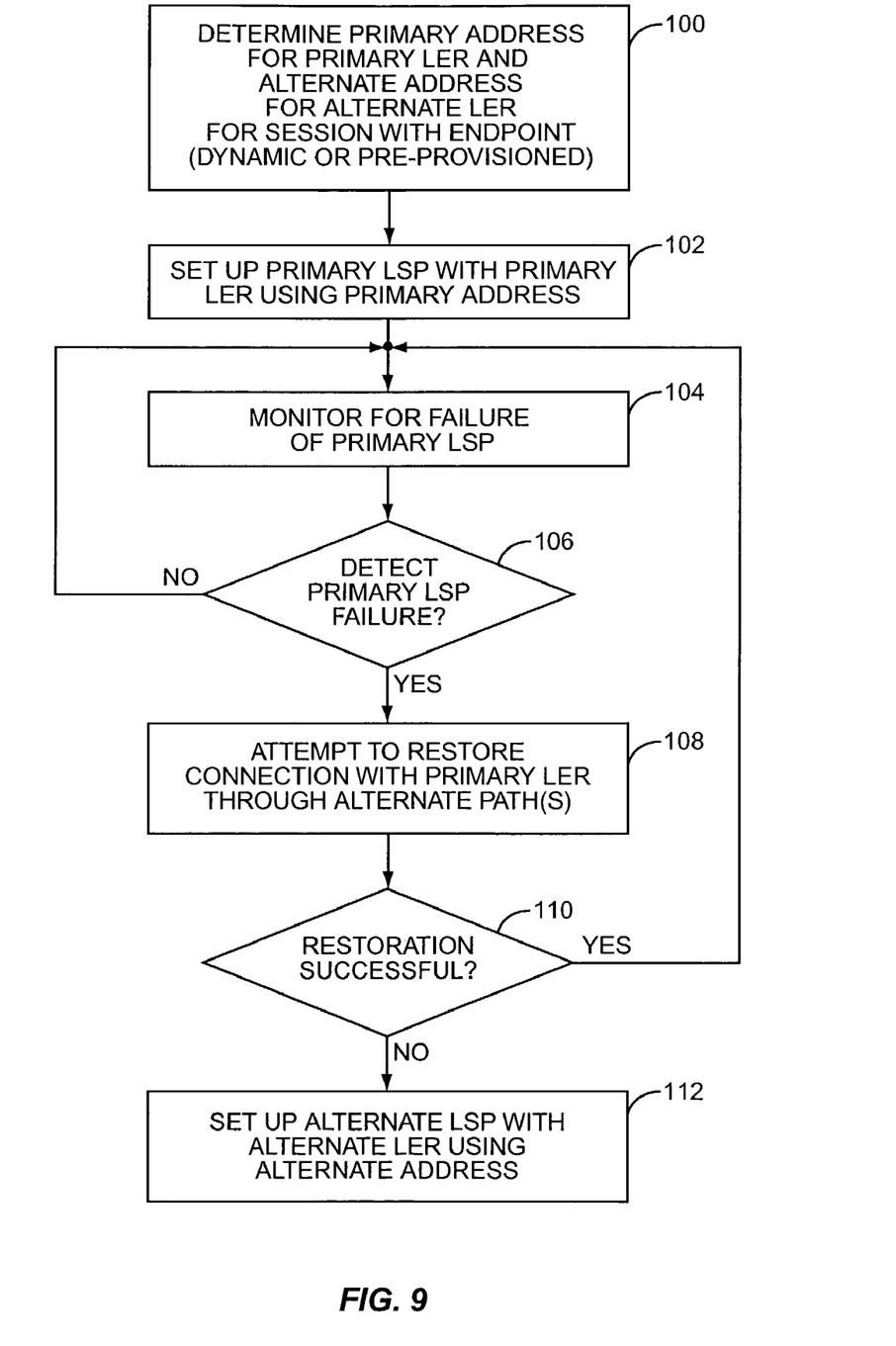
FIG. 9 is a flow diagram illustrating an exemplary failure recovery process according to one embodiment of the present invention.

The flow diagram of FIG. 9 provides an overview of an LER's functionality according to one embodiment of the present invention. Initially, the LER determines a primary address for a primary LER, and an alternate address for an alternate LER associated with an endpoint 28 with which a communication session is desired (step 100). The primary and alternate addresses for the primary and alternate LERs may be dynamically provided by the endpoints 28, the signaling network 22, or other device. Alternatively, the LERs may be pre-provisioned with these addresses based on the endpoint 28 with which communications are to be established.

Regardless of provisioning, when a communication session is required, the LER will set up a primary LSP with the primary LER using a primary address (step 102). During the ensuing communication session, the LER will monitor for a failure of the primary LSP (step 104). If a failure of the primary LSP is detected (step 106), the LER will preferably attempt to restore a connection with the primary LER through alternate paths, links, or LSRs (step 108). If the restoration attempt to the primary LER is not successful (step 110), the LER will set up an alternate LSP with the alternate LER using an alternate address (step 112), and communications will continue with the endpoint 28 through the alternate LER instead of the primary LER. Notably, the alternate and primary LERs on the other side of the MPLS network are configured to function in the same fashion, such that when failures are detected they will attempt to restore the connection, and if such an attempt fails, set up an alternate LSP to an alternate LER. Accordingly, the present invention resolves the issues associated with faults occurring at an LER, as well as dual-fault scenarios, with minimal complexity while avoiding wasting network resources. Since the LSPs to the alternate LERs are not established until a failure occurs, use of network resources is optimized with respect to LSP restoration.

Figure 10:
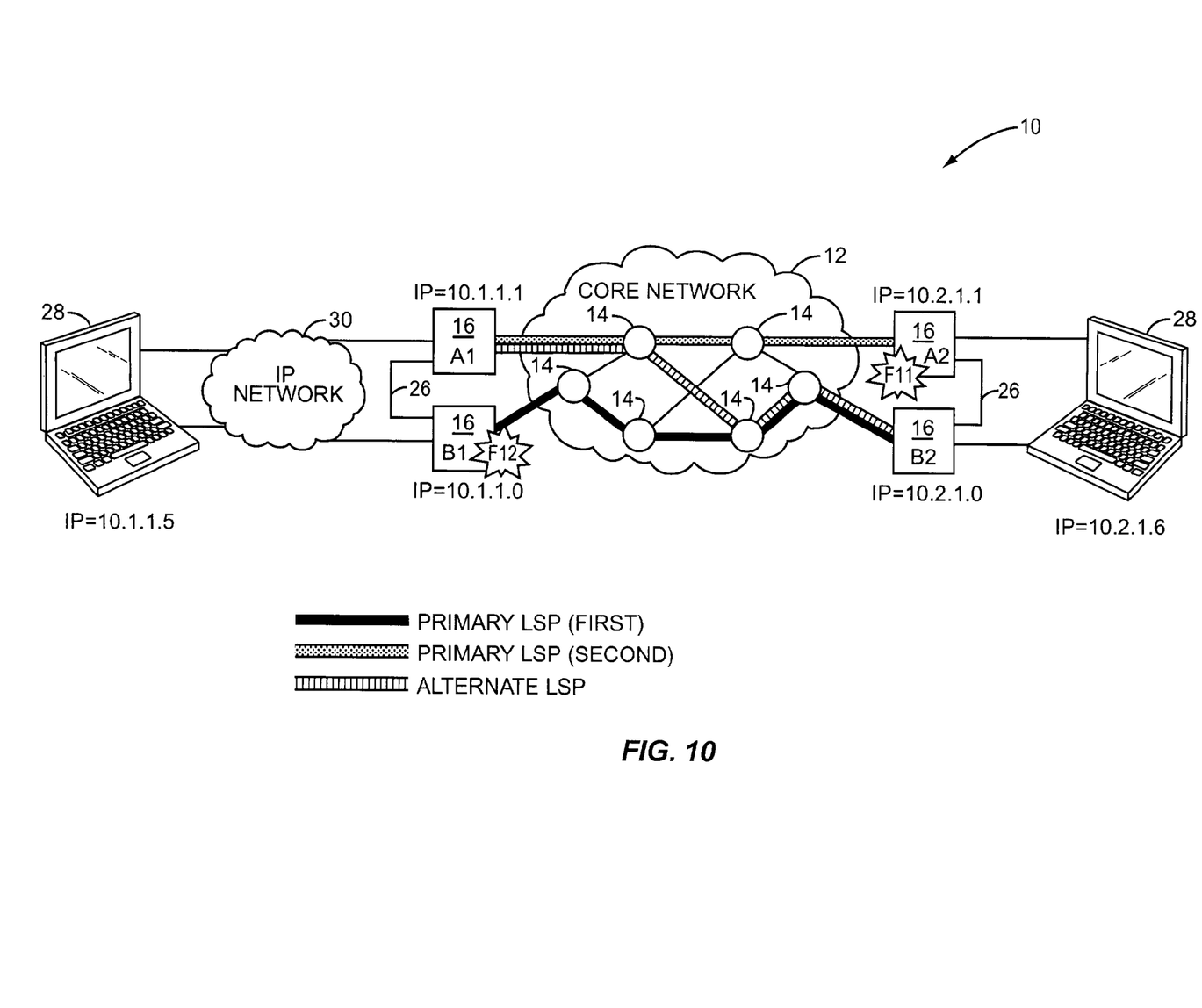
FIG. 10 is a block representation of the communication network infrastructure depicting a path restoration technique according to one embodiment of the present invention.

Turning now to FIG. 10, a scenario is shown wherein two LSPs are established between the endpoints 28. The first LSP is between LERs B1 and B2, and the second is between LERs A1 and A2. Even when LERs A2 and B1 fail (faults F11 and F12), one or more alternate LSPs may be established between LER A1 and LER B2 to support the communication session between the endpoints 28. Preferably, as faults are repaired, the primary LSPs are restored and the alternate LSPs are removed through system maintenance or an automated process, such as when a new session is established.

Each pair of edge routers 16 may be connected with a cross link 26 as described in association with FIG. 1. The cross link 26 is beneficial to allow temporary re-routing of packets when there is a failure between one of the edge routers 16 and the gateway interface 24, IP network 30, or endpoint 28. When there is such a failure, the edge router 16 associated with the failure can re-route packets to another edge router 16 having an operable connection. Those skilled in the art will recognize that the label switch paths are simply one way to facilitate a reserved path to define a communication path. Permanent virtual circuits on an asynchronous transfer mode (ATM) network and the like may also be used, in addition to any number of other ways to define a communication path in a packet-switched network.

Those skilled in the art will also recognize other improvements and modifications to the preferred embodiments of the present invention. All such improvements and modifications are considered within the scope of the concepts disclosed herein and the claims that follow.

What is claimed is:

1. A method comprising:
   a) determining a primary address for a primary edge router and an alternate address for an alternate edge router, the primary edge router and alternate edge router each capable of serving an internet protocol based endpoint associated with a communication session;
   b) providing a primary communication path with the primary edge router using the primary address;
   c) establishing the communication session via the primary edge router over the primary communication path;
   d) detecting a failure associated with the primary communication path;
   e) providing an alternate communication path with the alternate edge router using the alternate address after detecting the failure; and
   f) reestablishing the communication session via the alternate edge router over the alternate communication path, the primary and alternate communication paths being connection oriented, wherein the alternate communication path is parallel to the primary communication path.

2. The method of claim 1 further comprising attempting to reestablish the communication session with the primary edge router after detecting the failure and prior to reestablishing the communication session via the alternate edge router, wherein the communication session is reestablished via the alternate edge router when the attempt to reestablish the communication session via the primary edge router fails.

3. The method of claim 1 wherein the primary and alternate edge routers provide an interface between the endpoints and a core network in which the primary and alternate communication paths are formed.

4. The method of claim 3 wherein the core network is a multi-protocol label switching network, the primary and alternate communication paths are label switched paths, and the primary and alternate edge routers are label edge routers.

5. The method of claim 3 wherein the core network is an asynchronous transfer mode network and the primary and alternate communication paths are permanent virtual circuits.

6. The method of claim 1 further comprising reestablishing the communication session via the primary edge router.

7. The method of claim 1 wherein the alternate communication path is not reserved when the primary communication path is established.

8. The method of claim 1 further comprising establishing a communication connection with a second endpoint and associating the communication connection with the communication session.

9. The method of claim 1 wherein the endpoint is a gateway operatively coupled to the primary and alternate edge routers and facilitating a circuit-switched connection associated with the communication session to a telephony device.

10. The method of claim 1 wherein the endpoint is a packet-based device operatively coupled to the primary and alternate edge routers.

11. An edge router comprising:
   a) at least one interface; and
   b) a control system associated with the at least one interface and adapted to:
      i) determine a primary address for a primary edge router and an alternate address for an alternate edge router, the primary edge router and alternate edge router each capable of serving an internet protocol based endpoint associated with a communication session;
      ii) provide a primary communication path with the primary edge router using the primary address;
      iii) establish the communication session via the primary edge router over the primary communication path;
      iv) detect a failure associated with the primary communication path;
      v) provide an alternate communication path with the alternate edge router using the alternate address after detecting the failure; and
      vi) reestablish the communication session via the alternate edge router over the alternate communication path, the primary and alternate communication paths being connection oriented, wherein the alternate communication path is parallel to the primary communication path.

12. The edge router of claim 11 wherein said control system is further adapted to attempt to reestablish the communication session with the primary edge router after detecting the failure and prior to reestablishing the communication session via the alternate edge router, wherein the communication session is reestablished via the alternate edge router when the attempt to reestablish the communication session via the primary edge router fails.

13. The edge router of claim 11 wherein the primary and alternate edge routers provide an interface between the endpoints and a core network in which the primary and alternate communication paths are formed.

14. The edge router of claim 13 wherein the core network is a multi-protocol label switching network, the primary and alternate communication paths are label switched paths, and the edge router and the primary and alternate edge routers are label edge routers.

15. The edge router of claim 13 wherein the core network is an asynchronous transfer mode network and the primary and alternate communication paths are permanent virtual circuits.

16. The edge router of claim 11 wherein said control system is further adapted to reestablish the communication session via the primary edge router.

17. The edge router of claim 11 wherein the alternate communication path is not reserved when the primary communication path is established.

18. The edge router of claim 11 wherein said control system is further adapted to establish a communication connection with a second endpoint and associate the communication connection with the communication session.

19. The edge router of claim 11 wherein the endpoint is a gateway operatively coupled to the primary and alternate edge routers and facilitating a circuit-switched connection associated with the communication session to a telephony device.

20. The edge router of claim 11 wherein the endpoint is a packet-based device operatively coupled to the primary and alternate edge routers.

21. A computer readable medium comprising software for instructing a control system to:
   a) determine a primary address for a primary edge router and an alternate address for an alternate edge router, the primary edge router and alternate edge router each capable of serving an internet protocol based endpoint associated with a communication session;
   b) provide a primary communication path with the primary edge router using the primary address;
   c) establish the communication session via the primary edge router over the primary communication path;
   d) detect a failure associated with the primary communication path;
   e) provide an alternate communication path with the alternate edge router using the alternate address after detecting the failure; and
   f) reestablish the communication session via the alternate edge router over the alternate communication path, the primary and alternate communication paths being connection oriented, wherein the alternate communication path is parallel to the primary communication path.

22. The computer readable medium of claim 21 wherein said software provides further instructions to attempt to reestablish the communication session with the primary edge router after detecting the failure and prior to reestablishing the communication session via the alternate edge router, wherein the communication session is reestablished via the alternate edge router when the attempt to reestablish the communication session via the primary edge router fails.

23. The computer readable medium of claim 21 wherein the primary and alternate edge routers provide an interface between the endpoints and a core network in which the primary and alternate communication paths are formed.

24. The computer readable medium of claim 23 wherein the core network is a multi-protocol label switching network, the primary and alternate communication paths are label switched paths, and the primary and alternate edge routers are label edge routers.

25. The computer readable medium of claim 23 wherein the core network is an asynchronous transfer mode network and the primary and alternate communication paths are permanent virtual circuits.

26. The computer readable medium of claim 21 wherein said software provides further instructions to reestablish the communication session via the primary edge router.

27. The computer readable medium of claim 21 wherein the alternate communication path is not reserved when the primary communication path is established.

28. The computer readable medium of claim 21 wherein said software provides further instructions to establish a communication connection with a second endpoint and associate the communication connection with the communication session.

29. The computer readable medium of claim 21 wherein the endpoint is a gateway operatively coupled to the primary and alternate edge routers and facilitating a circuit-switched connection associated with the communication session to a telephony device.

30. The computer readable medium of claim 21 wherein the endpoint is a packet-based device operatively coupled to the primary and alternate edge routers.

* * * * *